United States Patent
Kekki

(10) Patent No.: US 8,004,972 B2
(45) Date of Patent: Aug. 23, 2011

(54) QUALITY OF SERVICE IN COMMUNICATION SYSTEMS

(75) Inventor: Sami Kekki, Helsinki (FI)

(73) Assignee: Spyder Navigations L.L.C., Wilmington, DE (US)

(*) Notice: Subject to any disclaimer, the term of this patent is extended or adjusted under 35 U.S.C. 154(b) by 1112 days.

(21) Appl. No.: 10/831,182

(22) Filed: Apr. 26, 2004

(65) Prior Publication Data

US 2005/0073953 A1    Apr. 7, 2005

(30) Foreign Application Priority Data

Oct. 7, 2003    (GB) .................................. 0323453.1

(51) Int. Cl.
*H04J 1/16*    (2006.01)
*H04W 72/00*    (2009.01)

(52) U.S. Cl. .................... 370/230; 455/452.1; 455/452.2

(58) Field of Classification Search .................. 370/230, 370/235, 338, 352, 401, 392, 468; 455/452.1, 455/452.2, 453
See application file for complete search history.

(56) References Cited

U.S. PATENT DOCUMENTS

| | | | | |
|---|---|---|---|---|
| 6,701,151 | B2* | 3/2004 | Diachina et al. | 455/452.1 |
| 6,728,208 | B1* | 4/2004 | Puuskari | 370/230.1 |
| 7,106,718 | B2* | 9/2006 | Oyama et al. | 370/340 |
| 2001/0053145 | A1* | 12/2001 | Willars et al. | 370/352 |
| 2002/0093925 | A1* | 7/2002 | Chuah | 370/332 |
| 2002/0114305 | A1* | 8/2002 | Oyama et al. | 370/338 |
| 2003/0108015 | A1* | 6/2003 | Li | 370/338 |
| 2005/0094567 | A1* | 5/2005 | Kannan et al. | 370/241 |

OTHER PUBLICATIONS

3G Technical Specification (TS) 23.107 V3.3.0: "Technical Specification Group Services and System Aspects; QoS Concept and Architecture; (Release 1999)," 3rd Generation Partnership Project (3GPP).*

* cited by examiner

*Primary Examiner* — Un C Cho

(57) ABSTRACT

A method for communication systems configured to provide wireless data communications for users is disclosed. The disclosed method includes communicating information with a node of a radio access part of the communication system. The information includes a first set of quality of service information and a second set of quality of service information. The second set of quality of service information is indicative of the nature of the information of the first set of quality of service information.

22 Claims, 4 Drawing Sheets

TNL-QoS Information Element:

TNL-QoS  Presence: Optional
Range 1..<max.number of DCHs for UE>
>Nature of TNL-QoS Semantics: binary flag
>TNL-QoS
>> DSCP  or alternatively (depending on the contents of the Nature of TNL-QoS)
>>Generic TNL-QoS codepoint TNL-QoS Information Element:

TNL-QoS      Presence: Optional
             Range 1..<max.number of DCHs for UE>
             Semantics: codepoint
>Nature of TNL-QoS
>TNL-QoS
>> DSCP  *or alternatively (depending on the contents of the Nature of TNL-QoS)*
>> Generic TNL-QoS codepoint *or alternatively (depending on the contents of the Nature of TNL-QoS)*
>> Generic QoS parameter #1 (e.g., transmission priority)
>> Generic QoS parameter #2 (e.g., transmission reliability)
>> ...
>> Generic QoS parameter #n (e.g., required delay variation)

Fig. 3       22

QUALITY OF SERVICE IN COMMUNICATION SYSTEMS

BACKGROUND OF THE INVENTION

1. Field of the Invention

The present invention relates to communication systems, and in particular, but not exclusively, to quality of service of data communications in a communication system.

2. Description of the Related Art

A communication system can be seen as a facility that enables communication sessions between two or more entities such as user equipment and/or other nodes associated with the communication system. The communication may comprise, for example, communication of voice, data, multimedia and so on. A user equipment may, for example, be provided with a two-way telephone call or multi-way conference call. A user equipment may also be provided with a connection to an application server (AS), for example a service provider server, thus enabling use of services provided by the application server.

A communication system typically operates in accordance with a given standard or specification which sets out what the various entities associated with the communication system are permitted to do and how that should be achieved. For example, the standard or specification may define if the user, or more precisely, user equipment is provided with a circuit switched service and/or a packet switched service. Communication protocols and/or parameters which shall be used for the connection may also be defined. In other words, a specific set of "rules" on which the communication can be based on needs to be defined to enable communication by means of the system.

Communication systems proving wireless communication for user equipment are known. An example of the wireless systems is the public land mobile network (PLMN). The PLMNs are typically based on cellular technology. In cellular systems, a base station (BS) or similar access entity of a radio access network serves wireless user equipment (UE) known also as mobile stations (MS) via a wireless interface between these entities. The communication on the wireless interface between the user equipment and the elements of the network can be based on an appropriate communication protocol. The operation of the base station apparatus and other elements of the radio access network required for the communication can be controlled by one or several control entities. The various control entities may be interconnected. A controller may be provided for each base station or a controller can control a plurality of base stations. Solutions wherein controllers are provided both in individual base stations and in the radio access network level for controlling a plurality of base stations are also known. It shall thus be appreciated that the name, location and number of the access network controllers depends on the system.

One or more gateway nodes may also be provided for connecting the mobile network to other networks, for example to a public switched telephone network (PSTN) and/or other communication networks such as an IP (Internet Protocol) and/or other packet switched data networks. For example, if a requested service is provided by a service provider located in other network, the service request is routed via the mobile network to the other network and then to the service provider.

The communication systems are continuously developed to allow introduction of new types of services, and to increase the efficiency of the communication systems. A project for such development is known as the third generation partnership project (3GPP).

Each communication system operates by running various different functions. For example, in communication environments such as those based on protocols such as the Internet Protocol (IP), the Session Initiation Protocol (SIP) and/or the current third generation (3G) communication network architectures various servers may be used for handling the provisioning of different communication services for users. In such communication systems the communication connections may not be based on a "circuit" between the communicating nodes, but the messages may rather be transported as packets that are provided with destination address information. Hence the name packet switched systems. The server entities and the user equipment may communicate with each other based on appropriate protocols providing such a connectionless operation.

The 3G Partnership Project (3GPP) is defining a reference architecture for the Universal Mobile Telecommunication System (UMTS) core network which will provide the users of UE (user equipment) with access to various services. Therefore the UMTS will be used in this specification as an example of a possible communication system enabling the communication services. Radio access is provided in the UMTS by means of a plurality of UMTS terrestrial radio access networks (UTRAN). Each UTRAN may employ a controller node that is referred to as a radio network controller (RNC). The UTRAN base stations are often referred to by the term NodeB.

The quality of service (QoS) is seen as one of the key concepts of the 3GPP UMTS in providing the level of service that users want for the service they use. QoS is believed to become even a more important issue when the traffic loads are increasing at the same time when more services are being made available for the users. In the IP network, the QoS attributes are mapped to standard Differentiated Services Code Point (DSCP) values. The DSCP values are transferred in the DSCP field of the IP header. The Differentiated Services Code Point value is provided in an IP header field of a packet to indicate the per hop behaviour (PHB) of the packet. The DSCP is used by routers to provide the correct quality of service (QoS) according to the defined traffic class.

The 3GPP specifications also specify the possibility of Internet Protocol (IP) based data transport in the radio access network between the network elements thereof, for example between nodes such as base station (e.g. the UTRAN NodeB), radio network controller (RNC), media gateway (MGW), and 3G serving GPRS support node (SGSN). However, the 3GPP only mandates use of the Differentiated Service (DiffServ) as a quality of service (QoS) mechanism for the IP based data transportation. This means that every UMTS terrestrial radio access network (UTRAN) node shall support the marking of the IP Differentiated Services Code Point (DSCP) values.

It has recently been discovered that the current way of signaling the IP connection information over UTRAN interfaces, i.e. between the radio access network nodes, might be problematic. For example, the connection information contains IP transport layer address and User Datagram Protocol (UDP) port numbers. The connection information does not contain any information regarding the quality of service on the transport network side, for example any information regarding the Transport Network Layer Quality Of Service (TNL-QoS). Despite this a requirement is that any bidirectional radio bearer provided by the access network such as the UTRAN is to have similar TNL-QoS treatment in both directions. This is irrespective of the transport technology used in the access network.

In 3GPP UTRAN it is assumed that the serving RNC is responsible for making decisions regarding the TNL-QoS. The originating UTRAN node has then the responsibility of marking the appropriate DSCP in the headers of those IP datagrams the originating node is transmitting, the originating node being the node that is transmitting the corresponding IP datagrams.

The present access network arrangements, however, are not able to guarantee that the access network nodes on either sides of a given interface understand the needed quality of service, such as the TNL-QOS, in a similar manner. For that reason it might be impossible to guarantee that for example the DSCP marked by a node is indeed such a DSCP that would result in the desired QoS in the transport network. This may become especially critical in the Iub interface between the RNC and the base station because the base station is not necessarily aware of those radio bearer parameters that are available for the RNC. Different access network controller nodes may have different logics. For example, it may be possible that a drift RNC has a different logic in determining the DSCP than a serving RNC.

It is also possible that different DiffServ domains are used. The term DiffServ domain is understood to refer to a part of the network or a network where common rules are in use for mapping a PHB to a DSCP. In another DiffServ domain these rules may be different. In that case a different DSCP would be required for the same PHB, as perceived by the datagram traversing the two domains. This may also cause problems.

Two alternative ways have been proposed to solve this problem in the 3GPP environments. In accordance with a proposal the required DiffServ Code Point (DSCP) that the peer node shall use is signalled on the Radio Network Layer (RNL) by means of an appropriate Application Protocol, for example by means of NBAP on Iub interface or RNSAP on Iur interface or RANAP on Iu interface. Another proposal has been to signal a generic, yet undefined, QoS information by means of the RNL Application Protocol so that the receiving node can then determine the appropriate DSCP based on that generic QoS information. Both of these proposals have problems, and therefore another solution might be desired.

Although the $1^{st}$ proposal is fairly straightforward to implement, as the DSCP only needs to be passed down to the IP application and then the peer node (e.g. NodeB) may start using this DSCP. However, this alternative is not feasible in scenarios where there are more than one differentiated services domain between the RNC and the NodeB i.e. the base station. In that case the DSCPs corresponding to the per hop behaviour are expected to be different in different domains. The DSCPs of IP datagrams become mapped in the border routers between the domains, but the border routers do neither see nor interpret the RNL signalling messages that are sent between the RNC and the NodeB. Thus the DSCP that is conveyed by means of the RNL Application Protocol does not get converted along the route between the peer UTRAN nodes. Moreover, if the QoS mechanism in the network was based on something else than the DiffServ, this proposal would not be feasible at all.

The $2^{nd}$ proposal might be problematic in that while it is expected to be feasible in all network environments, even in those where there is no DiffServ in use, it complicates the implementation both of the RNC and especially the NodeB. This is particularly true in those cases where DiffServ is used and only one DiffServ domain exists. If the "generic QoS" is used as the TNL-QOS info, both the Base station and the RNC need to have the additional capability to convert the generic QoS information to a DSCP.

Embodiments of the present invention aim to address one or several of the above problems.

SUMMARY OF THE INVENTION

According to one embodiment there is provided a method in a communication system configured to provide wireless data communications. The method comprises the step of communicating information with a node of a radio access part of the communication system. The information comprises a first set of quality of service information and a second set of quality of service information. The second set of quality of service information is indicative of the nature of the information of the first set of quality of service information.

According to another embodiment there is provided a communication system configured to provide wireless data communications for user equipment. The communication system comprises at least one node of a radio access part of the communication system, the node being configured to communicate information in a message comprising a number of information elements comprising at least a first set of quality of service information and a second set of quality of service information. The second set of quality of service information is indicative of the nature of the information of the first set of quality of service information.

According to yet another embodiment there is provided a node of a radio access part of a communication system configured to provide wireless data communications for user equipment. The node is configured to communicate information in a message comprising a number of information elements comprising at least a first set of quality of service information and a second set of quality of service information. The second set of quality of service information is indicative of the nature of the information of the first set of quality of service information.

According to yet another embodiment there is provided a message configured for communication to or from a node of a radio access part of a communication system. The communication system is configured to provide wireless data communications for user equipment. The message includes at least a first set of quality of service information and a second set of quality of service information. The second set of quality of service information is indicative of the nature of the information of the first set of quality of service information.

In a more detailed embodiment the second set of quality of service information is included in an information field that is separated from the first set of information.

The second set of quality of service information may comprise a flag indicative of one of two alternatives. The second set of quality of service information may define a quality of service mechanism selected from a plurality of quality of service mechanisms available for the associated communications. The second set of quality of service information may be directly indicative of the differentiated service code point associated with a particular communication. The first set of information may relate to quality of service used for the associated communications in the transport network layer of the communication system.

The embodiments of the invention may provide various advantages. The embodiments provide flexibility in the radio access network applications by enabling them to adapt to a number of possible network environments, and more particularly, to the manner how the Quality of Service is being provided in the given environment on the transport network layer thereof. The embodiments may also allow simpler implementation of the various network elements. For example, such base station implementations are possible wherein there is no need for any conversion logics between the generic QoS and the specific DSCP. Embodiments may also make it easier for the operator to easy operate and manage a network. This may be provided especially in embodiments wherein the nature of QoS functions does not necessarily need to be configured by means of an operation and/or management system provided in a particular network element.

BRIEF DESCRIPTION OF DRAWINGS

For better understanding of the present invention, reference will now be made by way of example to the accompanying drawings in which:

FIGS. 2 and 3 show two exemplifying information elements;

FIG. 5 shows a message with a plurality of information elements.

DESCRIPTION OF PREFERRED EMBODIMENTS

Figure 1:
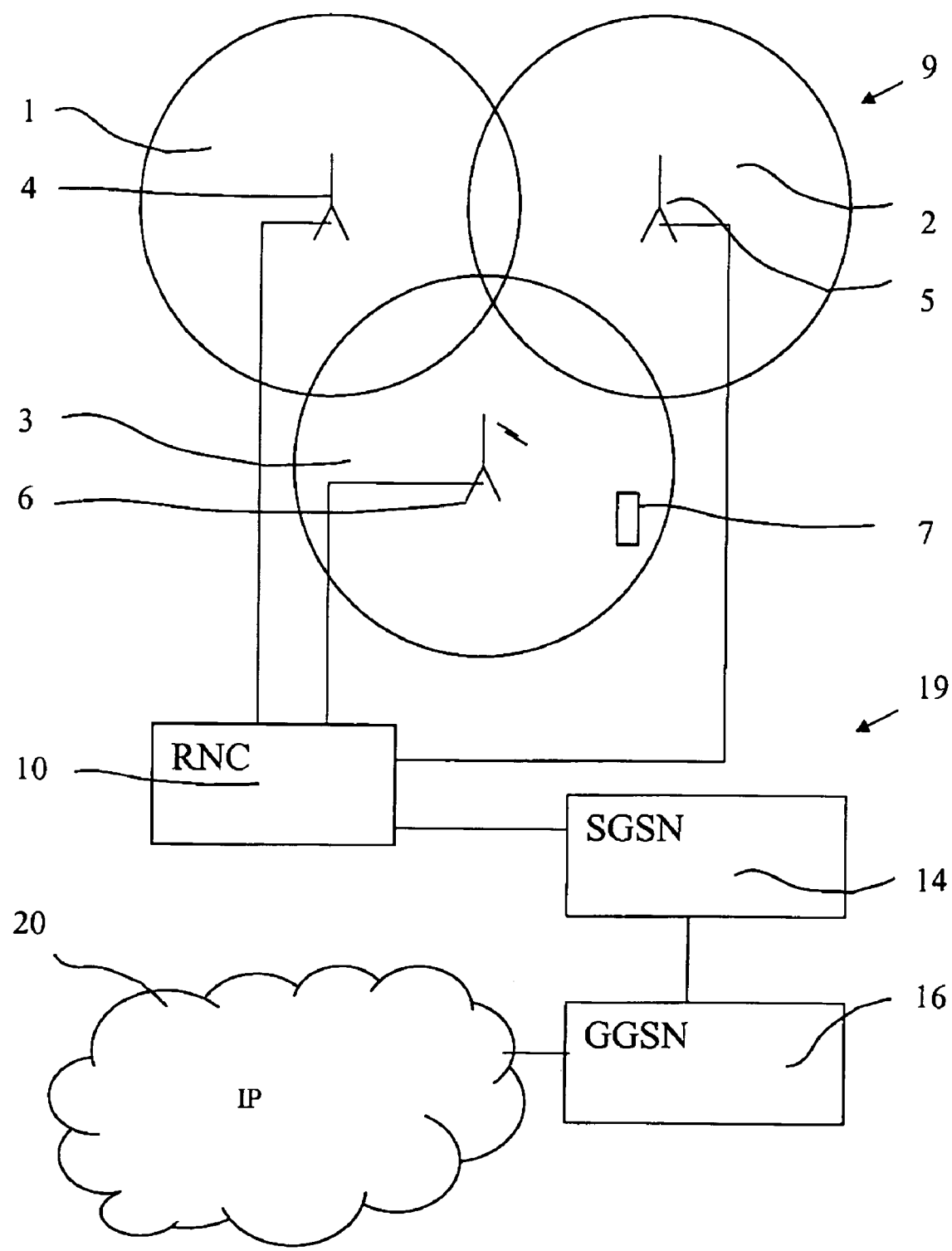
FIG. 1 shows a communication system wherein the present invention may be embodied.

Before explaining some preferred embodiments of the invention in more detail, a reference is made to FIG. 1, which is a simplified presentation of a part of a cellular system. More particularly, FIG. 1 shows some of the elements of a radio access network (RAN) 9 and a core network (CN) 19 of an exemplifying UMTS system.

In the shown arrangement three transceiver nodes i.e. base stations 4, 5 and 6 which provide three cells 1 to 3 of a cellular telecommunications network. The cells are controlled by a controller node 10. This node will be referenced to in the following as the radio network controller or RNC. All these nodes belong to the radio access network 9. Each base station 4 to 6 is arranged to transmit signals to (downlink) and receive signals from (uplink) a mobile device 7 of a mobile user via a wireless interface. The mobile user may use any appropriate mobile device adapted for Internet Protocol (IP) or other packet data communication via the network. For example, the mobile user may access the cellular network by means of a Personal computer (PC), Personal Data Assistant (PDA), mobile station (MS) and so on.

It shall be appreciated that the FIG. 1 presentation is highly schematic and that in practical implementations the number of base stations would be substantially higher. One cell may include more than one base station site. A base station apparatus or site may also provide more than one cell. The radio access network may also comprise only one cell. These features depend on the implementation and circumstances.

The radio access network 9 is controlled by an appropriate controller node 10. The controller node 10 may be provided by any appropriate controller. A controller may be provided for each base station or a controller can control a plurality of base stations. Solutions wherein controllers are provided both in individual base stations and in the radio access network level for controlling a plurality of base stations are also known. It shall thus be appreciated that the name, location and number of the radio access network controllers depends on the system. For example, a UMTS terrestrial radio access network (UTRAN) may employ a controller node that is referred to as a radio network controller (RNC). In the GSM and CDMA2000 a radio network controller entity may be provided by a base station controller (BSC). In FIG. 1 the possible radio network controllers are denoted by the controller node 10.

The core network (CN) entities typically comprises various switching elements and gateways for enabling the communication via a number of radio access networks and also for interfacing the one cellular system with other communication system such as with other cellular systems and/or fixed line communication systems. The controller entity 10 associated with the radio access network may be connected to any appropriate core network element via a suitable interface and/or gateway arrangement.

The access network may be connected to a core network controller node such as a MSC (mobile switching centre) or a SGSN (serving GPRS support node) 14. The core network node 14 provides various control functions such as keeps track of the mobile station's location for the purposes of call routing and performs security functions and access control. Each subscriber is typically registered in a register functionality (not shown for clarity). Examples of these include a Home Location Register (HLR) and Home Subscriber Server (HSS). The core network controller 14 may be connected to further nodes such as a gateway 16 for connection to at least one other communication network. The PLMN system may be connected to various other communication networks, such as to another PLMN, to a public switched telephone network (PSTN) or to a data networks such as the Internet. The other networks are designated by the cloud 20 in FIG. 1. The various networks may be interconnected to each other via appropriate interfaces and/or gateways.

The following described in more detail a possible mechanism in accordance with the invention that allows a node of the radio access network, for example the RNC, to use either a direct DiffServ Code Point (DSCP) or a generic QoS as the Transport Network Layer Quality Of Service (TNL-QoS) information and to signal this to another access network node. Such other network access network node may comprise, for example, a base station or a peer RNC in another Radio Network Subsystem (RNS).

In the exemplifying embodiments described below the access network controller signals in a message to the base station two sets of information, the first set defining the quality of service information as such and the second set defining the nature of the information included in the first set.

The first set thus provides the "actual" QoS information. The first set may be, for example, the DSCP, a set of parameters defining a generic QoS, or a codepoint referring to a generic QoS.

Figures 2, 5:
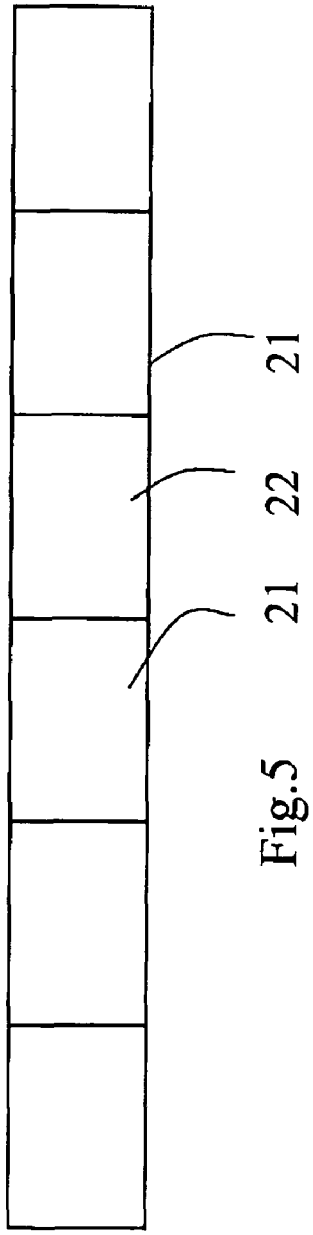

The second set may, for example, be a binary flag indicating "DSCP" or "generic QoS". For example, the second set of information may be in the form of a simple binary flag in the Transport Network Layer Quality Of Service (TNL-QoS) Information Element (IE). Some examples for the content of the TNL-QoS Information Elements 22 are shown in FIGS. 2 and 3.

According to a possibility the second set of information allows the originating node to specify in a message the nature of the QoS information in a more detailed way.

In a preferred embodiment the second set of information is provided by means of adding an additional information field in the Transport Network Layer Quality Of Service (TNL-QoS) information separating the second set of information from the first set of information. The additional information field can then be used for indicating the nature of the QoS information.

In accordance with another possibility the additional information field may be a separate parameter, allowing communication of more detailed information, for example operation where more than two alternatives for the nature of QoS information may be communicated.

Figure 4:
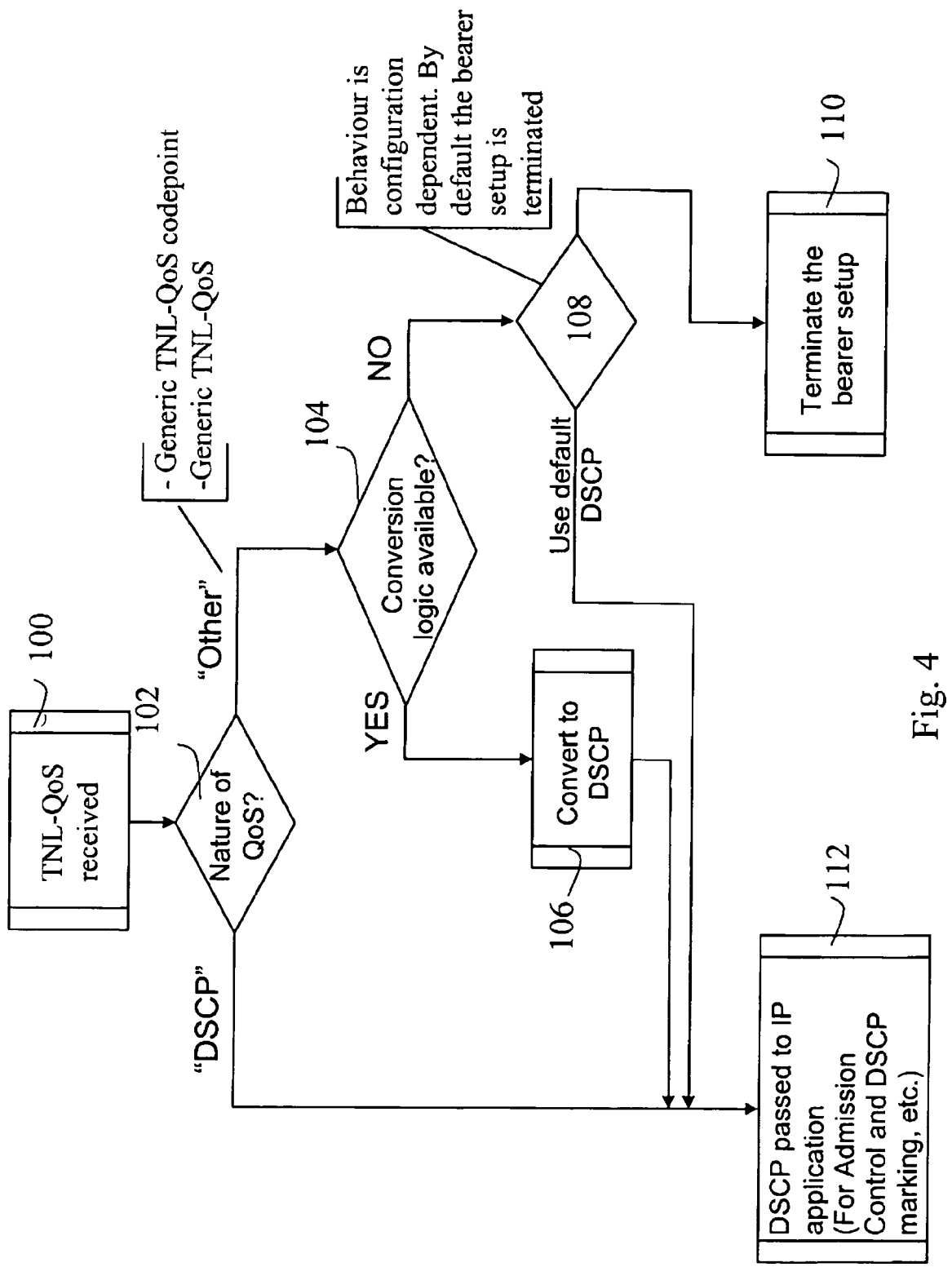
FIG. 4 is a flowchart for an exemplifying application of an embodiment in a receiver.

FIG. 4 shows a flowchart for operation in a receiver after a receipt of a message containing QoS information. The receiver may be, for example, a base station of a mobile communication system. After the information is received at step 100, a decision is made at step 102 regarding the nature of the QoS information. The following steps to be taken flow then from the decision at step 102. If "DSCP" was indicated in the QoS information, the DSCP is passed in step 112 to the IP application.

If another type of QoS information is provided, conversions may be required. A check can be made at step 104 if a conversion logic is available. If yes, an appropriate conversion is performed at step 106. If not, another behaviour may follow. The appropriate action is decided at step 108. For example, a default DSCP may be used. If no default is available, or if no other action is defined, the bearer set-up may be terminated at step 110.

The two sets of information may be transported together with a number of other Information Elements and Parameters in the actual message. FIG. 5 shows a message comprising a plurality of information elements 21, one of which being an information element 21 containing two sets of QoS information. The two sets mentioned above are preferably included in the part of the message specifying the transport layer information of the given Radio Link that is being setup. As an example, the "actual TNL-QoS" and the "nature of the TNL-QoS" parameters may be included in a NodeB Application Part Dedicated Channel Information Information Element (NBAP DCH Information IE). This IE may then be used for example in NBAP Radio Link Setup and in Radio Link Reconfiguration procedures.

The generic QoS information may include parameters for describing the required transfer delay, the transfer delay variation, the packet loss probability, the transmission reliability and/or the transmission priority. However, these are only examples, and other parameters are also possible.

The introduction of such an information field indicative of the nature of the QoS information may allow simpler base station implementations, especially from the software point of view. Advantage may especially be expected in cases where there is only one DiffServ domain involved in the transport network of the given interface.

However, the simpler base station implementations may also be allowed in the case of multiple DiffServ domains provided that the RNC can do the conversion between the original DSCP and the equivalent one in the destination domain. This conversion can be done provided that the RNC has access to the necessary configuration data about the transport network configuration in the end-to-end scope and that the RNC has the necessary logic to do the conversion.

The additional information field may also allow for more complicated transport network arrangements, involving multiple DiffServ domains or even other than DiffServ based QoS mechanisms. By means of the additional information field a single network element, for example a RNC, can support a plurality of network environments on a per interface or even per originating/destination IP address basis.

In the case where there is only one DiffServ domain in the given interface between its two endpoints, the nature of the QoS information field may indicate that the TNL-QOS parameter contains a DSCP that is then directly used by the destination base station without any conversions.

In cases where there are more than one DiffServ domain in the transport network between the two UTRAN nodes, the nature of the QoS information field may be set by the RNC to indicate a "generic QoS" information. The base station may be provided with appropriate logic to make the conversion from the generic QoS to the equivalent DSCP. It shall be appreciated that also in this case the nature of the QoS information field can be set to "DSCP", provided that the RNC has the capability to map its original DSCP to the one that is equivalent in the domain where the base station is attached to.

It shall be appreciated that base stations can sometimes be referred to as node B. In addition, the term cell is intended to cover also a group of cells in instances where more than one cell is controlled by a controller entity.

In addition to the dedicated channels mentioned in the above examples, the embodiments are also applicable to other channels as well. For example, the embodiments are applicable to Downlink Shared Channels. Especial advantage might be expected in the case of High Speed Downlink Shared Channel (HS-DSCH).

Examples of procedures where the embodiments may be used include NodeB Application Part (NBAP) procedures, for example NBAP Radio Link Setup and NBAP Radio Link Reconfiguration. Both of these exemplifying procedures involve the establishment of one or several transport bearers. Other examples of the possible protocol environments comprise the Radio Network Subsystem Application Part (RNSAP) and Radio Access Network Application Part (RANAP) protocols. The required information may be included in at least one Information Element (IE) into a message in accordance with these or any other appropriate protocol.

The embodiments of the present invention has been described in the context of a 3GPP system, and with reference to elements of a UMTS communication system. This invention is also applicable to any other communication standard where similar problems might occur. For example, the embodiments may be applied to systems such as the GSM, GPRS and CDMA2000. In these systems a radio network controller entity is provided by means of a base station controller (BSC).

It shall also be appreciated that whilst embodiments of the present invention have been described in relation to network nodes such as radio network controllers and base stations, embodiments of the present invention are applicable to any other suitable type of networks nodes, for example to appropriate core network nodes. The embodiments of the invention are also applicable to other interfaces than the examples described above, for example to on Iur interface between RNC nodes.

It is also noted herein that while the above describes exemplifying embodiments of the invention, there are several variations and modifications which may be made to the disclosed solution without departing from the scope of the present invention as defined in the appended claims.

The invention claimed is:

1. A method in a communication system configured to provide wireless data communications, the method comprising:

communicating information with a node of a radio access part of the communication system, the information comprising a first set of quality of service information, wherein the first set of quality of service information comprises a quality of service parameter which is related to an actual transport network layer quality of service, wherein the quality of service parameter comprises at least one of a differentiated service code point, a set of parameters defining a generic quality of service, or a code point referring to the generic quality of service; and a second set of quality of service information, wherein the first set of quality of service information and the second set of quality of service information are included in a downlink shared channel, wherein the second set of quality of service information comprises an indication of whether the quality of service parameter comprises at least one of a differentiated service code point, a set of parameters defining a generic quality of service, or a code point referring to the generic quality of service.

2. The method as claimed in claim 1, further comprising including the second set of quality of service information in a separate information field than the first set of quality of service information.

3. The method as claimed in claim 1, wherein the indication comprises a flag indicative of at least one of the differentiated service code point, the set of parameters defining the generic quality of service, or the code point referring to the generic quality of service.

4. The method as claimed in claim 1, further comprising defining a quality of service mechanism selected from a plurality of quality of service mechanisms available for associated communications by the second set of quality of service information.

5. The method as claimed in claim 1, wherein the node of the radio access part of the communication system comprises one of
a base station of a radio access network, a radio access network controller, a media gateway, or a serving GPRS support node.

6. The method as claimed in claim 1, further comprising sending the information from a radio network controller.

7. The method as claimed in claim 1, wherein the radio access part comprises a universal mobile telecommunication system terrestrial radio access network.

8. The method as claimed in claim 1, wherein the first set of quality of service information relates to quality of service used for associated communications in a transport network layer of the communication system.

9. The method as claimed in claim 8, wherein the first set of quality of service information further comprises a second quality of service parameter, wherein the second quality of service parameter comprises at least one of
a required transfer delay, a transfer delay variation, a packet loss probability, a transmission reliability, or a transmission priority.

10. The method as claimed in claim 1, further comprising including the first set of quality of service information and the second set of quality of service information in a nodeB application part dedicated channel information element.

11. A communication system to provide wireless data communications for user equipment, the communication system comprising:
at least one node of a radio access part of a communication system, the at least one node configured to communicate information in a message comprising a plurality of information elements, the information comprising
a first set of quality of service information, wherein the first set of quality of service information comprises a quality of service parameter which is related to an actual transport network layer quality of service, wherein the quality of service parameter comprises at least one of a differentiated service code point, a set of parameters defining a generic quality of service, or a code point referring to the generic quality of service; and a second set of quality of service information, wherein the first set of quality of service information and the second set of quality of service information are included in a downlink shared channel, wherein the second set of quality of service information comprises an indication of whether the quality of service parameter comprises at least one of a differentiated service code point, a set of parameters defining a generic quality of service, or a code point referring to the generic quality of service.

12. The system as claimed in claim 11, wherein the second set of quality of service information is used by the communication system to identify a quality of service mechanism selected from a plurality of quality of service mechanisms available for associated communications.

13. The system as claimed in claim 11, wherein the at least one node of the radio access part of the communication system comprises one of
a base station of the radio access network, a radio access network controller, a media gateway, or a serving GPRS support node.

14. The system as claimed in claim 11, wherein the radio access part comprises a universal mobile telecommunication system terrestrial radio access network.

15. The system as claimed in claim 11, wherein the first set of quality of service information relates to a quality of service used for associated communications in a transport network layer of the communication system.

16. A node of a radio access part of a communication system configured to provide wireless data communications for user equipment, the node configured to communicate information in a message comprising a plurality of information elements, the information comprising
a first set of quality of service information, wherein the first set of quality of service information comprises a quality of service parameter which is related to an actual transport network layer quality of service, wherein the quality of service parameter comprises at least one of a differentiated service code point, a set of parameters defining a generic quality of service, or a code point referring to the generic quality of service; and
a second set of quality of service information, wherein the first set of quality of service information and the second set of quality of service information are included in a downlink shared channel, wherein the second set of quality of service information comprises an indication of whether the quality of service parameter comprises at least one of a differentiated service code point, a set of parameters defining a generic quality of service, or a code point referring to the generic quality of service.

17. The node as claimed in claim 16, comprising a radio network controller.

18. The node as claimed in claim 16, comprising a base station.

19. A communication system to generate a message configured for communication to or from a node of a radio access part of the communication system, the communication system configured to provide wireless data communications for user equipment, the message including
a first set of quality of service information, wherein the first set of quality of service information comprises a quality of service parameter which is related to an actual transport network layer quality of service, wherein the quality of service parameter comprises at least one of a differentiated service code point, a set of parameters defining a generic quality of service, or a code point referring to the generic quality of service; and a second set of quality of service information, wherein the first set of quality of service information and the second set of quality of service information are included in a downlink shared channel, wherein the second set of quality of service information comprises an indication of whether the quality of service parameter comprises at least one of a differentiated service code point, a set of parameters defining a generic quality of service, or a code point referring to the generic quality of service.

20. A node of a radio access part of a communication system to provide wireless data communications for user equipment, the node comprising:

communicating means for communicating information in a message comprising a plurality of information elements comprising a first set of quality of service information and a second set of quality of service information, wherein the first set of quality of service information comprises a quality of service parameter which is related to an actual transport network layer quality of service, wherein the quality of service parameter comprises at least one of a differentiated service code point, a set of parameters defining a generic quality of service, or a code point referring to the generic quality of service; and indicating means for indicating that the second set of quality of service information comprises an indication of whether the quality of service parameter comprises at least one of a differentiated service code point, a set of parameters defining a generic quality of service, or a codepoint referring to the generic quality of service, wherein the first set of quality of service information and the second set of quality of service information are included in a downlink shared channel.

21. A method in a communication system configured to provide wireless data communications, the method comprising:

communicating information with a node of a radio access part of the communication system, the information comprising a first set of quality of service information, wherein the first set of quality of service information comprises a quality of service parameter, wherein the quality of service parameter comprises at least one of a differentiated service code point, a set of parameters defining a generic quality of service, or a code point referring to the generic quality of service, and wherein the first set of quality of service information relates to quality of service used for associated communications in a transport network layer of the communication system; and a second set of quality of service information wherein the second set of quality of service information comprises an indication of whether the quality of service parameter comprises at least one of a differentiated service code point, a set of parameters defining a generic quality of service, or a code point referring to the generic quality of service.

22. The method as claimed in claim 21, wherein the first set of quality of service information further comprises a second quality of service parameter, wherein the second quality of service parameter comprises at least one of a required transfer delay, a transfer delay variation, a packet loss probability, a transmission reliability, or a transmission priority.

* * * * *